US009715481B2

(12) United States Patent
Golovashkin et al.

(10) Patent No.: US 9,715,481 B2
(45) Date of Patent: *Jul. 25, 2017

(54) APPROACH FOR MORE EFFICIENT USE OF COMPUTING RESOURCES WHILE CALCULATING CROSS PRODUCT OR ITS APPROXIMATION FOR LOGISTIC REGRESSION ON BIG DATA SETS

(71) Applicant: Oracle International Corporation, Redwood Shores, CA (US)

(72) Inventors: Dmitry Golovashkin, Belmont, CA (US); Uladzislau Sharanhovich, San Jose, CA (US); Vaishnavi Sashikanth, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 175 days.

This patent is subject to a terminal disclaimer.

(21) Appl. No.: 14/642,182

(22) Filed: Mar. 9, 2015

(65) Prior Publication Data
US 2015/0378962 A1 Dec. 31, 2015

Related U.S. Application Data

(60) Provisional application No. 62/018,450, filed on Jun. 27, 2014.

(51) Int. Cl.
| G06F 7/52 | (2006.01) |
| G06F 17/16 | (2006.01) |
| G06K 9/62 | (2006.01) |
| G06K 9/46 | (2006.01) |

(52) U.S. Cl.
CPC ........... *G06F 17/16* (2013.01); *G06K 9/6267* (2013.01); *G06K 2009/4695* (2013.01)

(58) Field of Classification Search
CPC .............................. G06F 17/16; G06K 9/6267
USPC ......................................................... 708/607
See application file for complete search history.

(56) References Cited

U.S. PATENT DOCUMENTS 9,317,482 B2 * 4/2016 Davis ...................... G06F 17/16
2011/0307685 A1 * 12/2011 Song ...................... G06F 17/10
712/16

* cited by examiner

*Primary Examiner* — Tan V. Mai
(74) *Attorney, Agent, or Firm* — Hickman Palermo Becker Bingham LLP

(57) ABSTRACT

According to one technique, a modeling computer computes a Hessian matrix by determining whether an input matrix contains more than a threshold number of dense columns. If so, the modeling computer computes a sparsified version of the input matrix and uses the sparsified matrix to compute the Hessian. Otherwise, the modeling computer identifies which columns are dense and which columns are sparse. The modeling computer then partitions the input matrix by column density and uses sparse matrix format to store the sparse columns and dense matrix format to store the dense columns. The modeling computer then computes component parts which combine to form the Hessian, wherein component parts that rely on dense columns are computed using dense matrix multiplication and component parts that rely on sparse columns are computed using sparse matrix multiplication.

8 Claims, 5 Drawing Sheets

FIG. 1
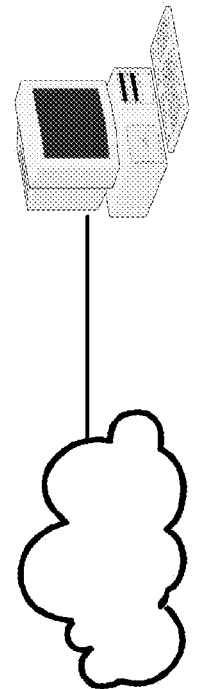
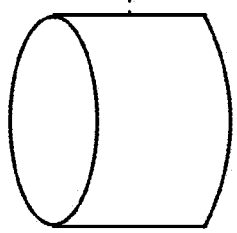
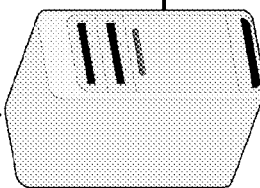

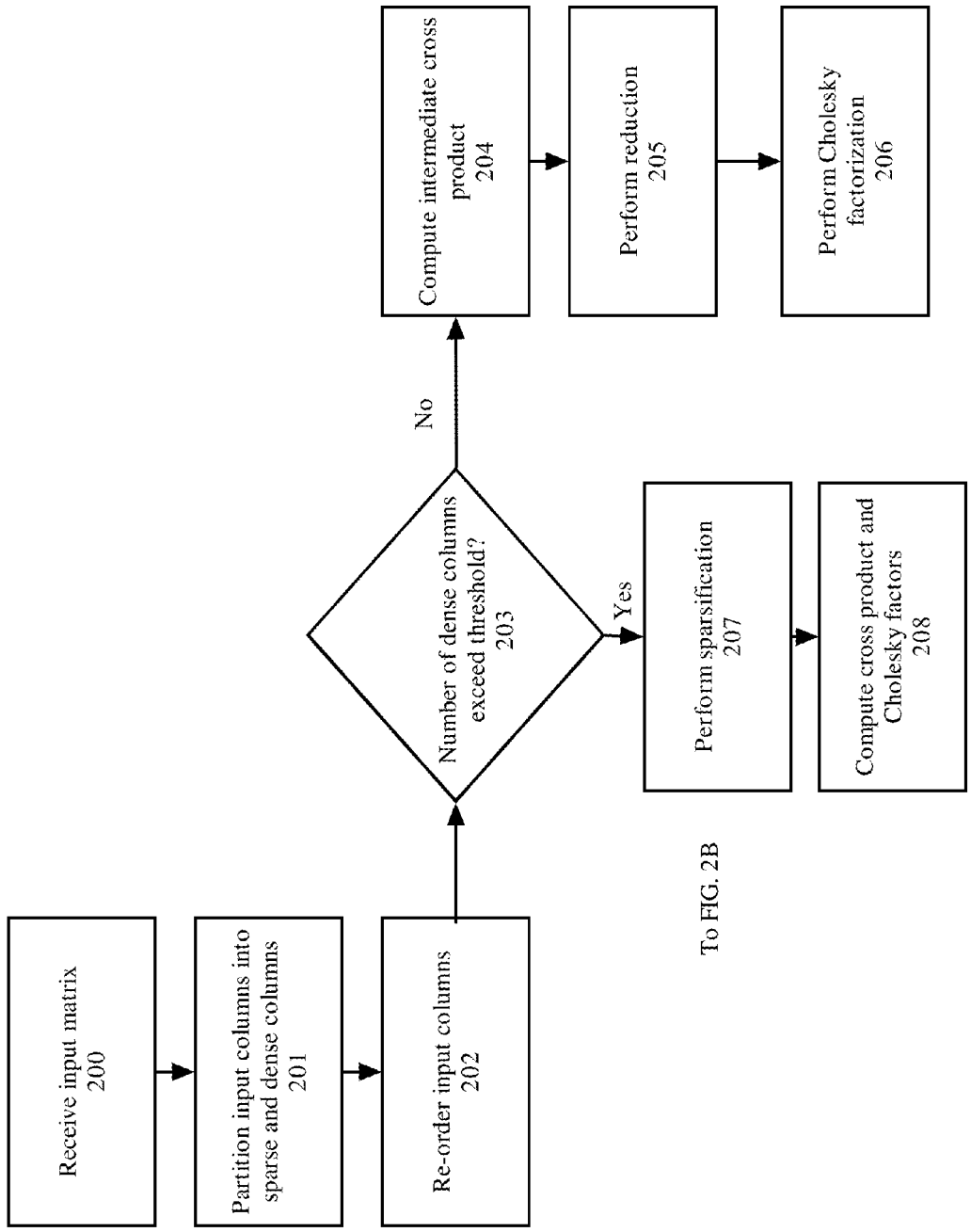

US 9,715,481 B2

APPROACH FOR MORE EFFICIENT USE OF COMPUTING RESOURCES WHILE CALCULATING CROSS PRODUCT OR ITS APPROXIMATION FOR LOGISTIC REGRESSION ON BIG DATA SETS

PRIORITY CLAIMS

RELATED APPLICATIONS

This application is a non-provisional of U.S. patent application Ser. No. 62/018,450, filed Jun. 27, 2014, entitled "Efficient Cross Product Algorithm for Logistic Regression", the entire contents of which is incorporated for all purposes as though fully stated herein.

EFFICIENT CROSS PRODUCT ALGORITHM FOR LOGISTIC REGRESSION

The techniques presented herein are directed towards efficiently solving statistical probability models. More specifically, the techniques presented herein are directed towards solving a logistic regression model by efficiently computing the Hessian and/or sparsifying the input matrix.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The Newton algorithm and its variants, notably Iteratively Reweighted Least Squares (IRLS), are algorithms of choice to solve logistic regression models. IRLS often requires a small number of iterations to converge compared to alternative techniques, such as Broyden-Flecher-Goldfarb-Shanno (BFGS), Alternating Direction Method of Multipliers (ADMM), or nonlinear conjugate gradient descent. Newton algorithms in general and IRLS in particular rely upon the efficient calculation of the Hessian matrix: $H=X^TAX$, where $X \in IR^{m \times n}$ is the input data, and $A \in IR^{m \times m}$ is a diagonal matrix. Computing H (also known as the "cross product") and its Cholesky factors are generally the most time consuming steps of the Newton algorithm and its variants.

In many cases, an exact Hessian matrix is not required for the algorithm to eventually converge, any "sufficiently close" symmetric positive-definite approximation will yield reasonable performance, but may require the algorithm to iterate more times than if the exact Hessian were used. In addition, Hessian approximations can be effectively used as preconditions for other techniques, such as Trust Region Newton and Preconditioned Conjugate Gradient frameworks.

BRIEF DESCRIPTION OF THE DRAWINGS

The present invention is illustrated by way of example, and not by way of limitation, in the figures of the accompanied drawings and in which like reference numerals refer to similar elements and in which:

FIG. 1 is a block diagram illustrating an example operating environment upon which an embodiment of the present invention may be implemented.

FIG. 2 is a block diagram illustrating a process to efficiently compute a Hessian (cross product) according to an embodiment.

DETAILED DESCRIPTION

Figure 3A:
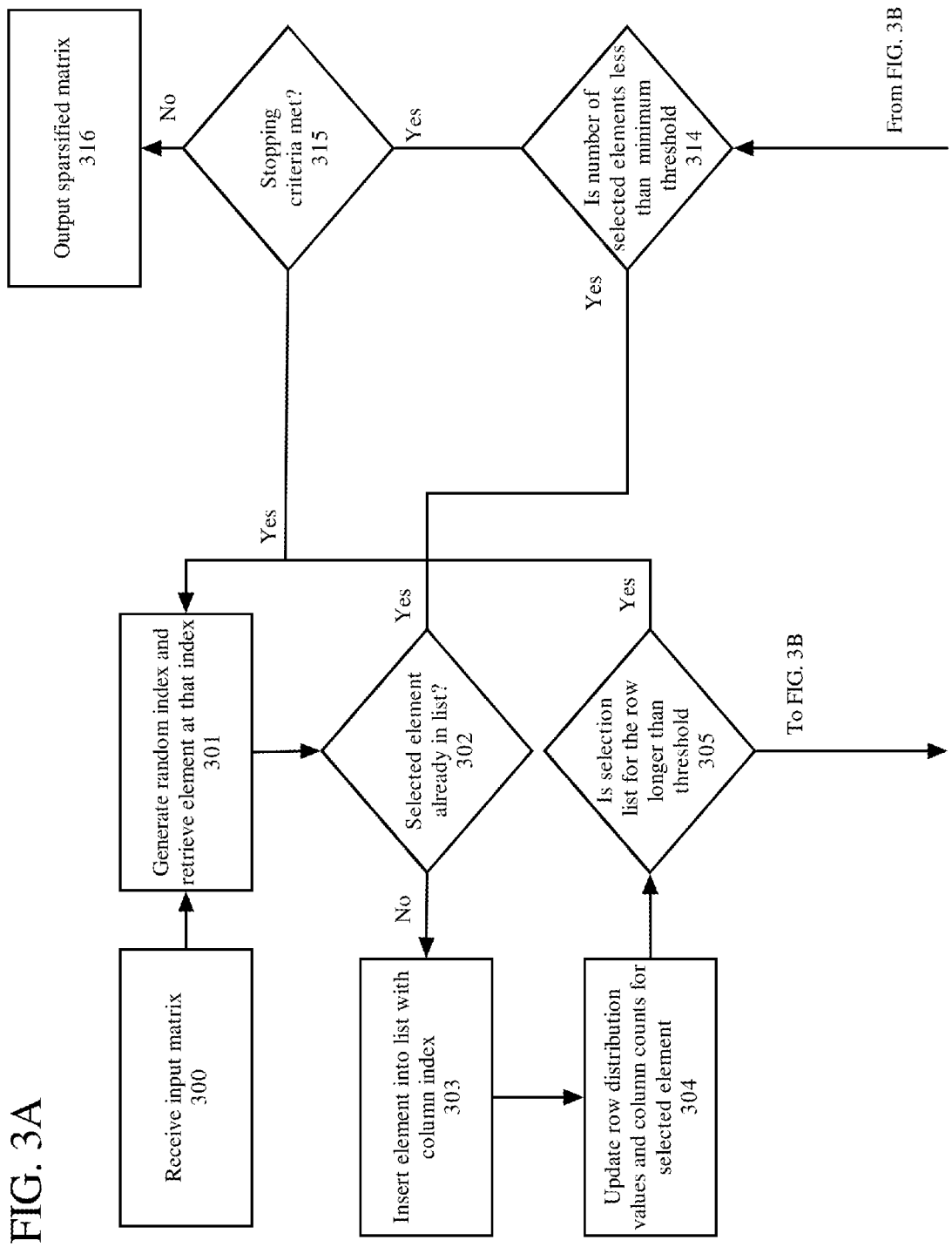
FIG. 3A is a block diagram illustrating a first view of a process for sparsifying a matrix according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Operating Environment
3.0 Identifying Sparse and Dense Matrix Data
4.0 Nomenclature and Problem Summary
5.0 Efficient Cross Product Algorithm for Logistic Regression
6.0 Fuzzy Selection of Maximum Values in a Matrix
7.0 Hardware Overview
8.0 Extensions and Alternatives

1.0 General Overview

In an embodiment, a modeling computer computes a Hessian matrix by determining whether an input matrix contains more than a threshold number of dense columns (columns with few zero value elements). If so, the modeling computer computes a sparsified version of the input matrix using a technique referred to as fuzzy selection of maximum values in a matrix. The aforementioned technique constructs a sparse matrix (stored in a "sparse format" that efficiently stores matrices with few zero value elements) by taking random samples of the original input matrix and ensuring that a minimum number of elements for each row and column are pulled from the input matrix. In addition, preference is given during the random sampling to replacing elements in the sparse matrix with elements holding greater values in order to preserve those elements that have a greater effect on matrix operations, such as matrix multiplication. The Hessian matrix approximation is then computed from the sparse matrix using sparse matrix multiplication configured to operate efficiently on sparse format matrices. Since the sparsified matrix contain columns with many zero value elements (compared to the original matrix), matrix multiplication can be performed more efficiently since only operations where both elements are non-zero are actually performed. When the Hessian is computed for an iterative regression algorithm, such as Iteratively Reweighted Least Squares (IRLS), the substitution may result in additional iterations being performed due to the sparsified matrix only being an approximation of the original input matrix. However, for a sufficiently large and/or dense input matrix, the processing time required for the additional iterations is far outweighed by the benefit of a faster Hessian computation.

If the number of dense columns is below the threshold, the modeling computer identifies which columns are dense and which columns are sparse. The modeling computer then partitions the input matrix by column density and uses sparse matrix format to store the sparse columns and dense matrix format to store the dense columns. The modeling computer then calculates component parts which combine to form the Hessian, where component parts that rely on dense columns are computed using dense matrix multiplication and component parts that rely solely on sparse columns are computed using sparse matrix multiplication. As a result, a significant speedup of computing the Hessian can be obtained by utilizing the type of storage and operation that is most efficient for each component part. This is opposed to, for example, storing the entire matrix in either a dense matrix format or a sparse matrix format, which can result in unneeded multiplication operations being performed or an excessive number of indirect accesses to the elements of the matrix.

2.0 Example Operating Environment

FIG. 1 is a block diagram illustrating an example operating environment upon which an embodiment of the present invention may be implemented. In FIG. 1, the operating environment includes a database 100 storing a table 104 of data, a database server 101, a network 102, and a modeling computer 103.

Although only a particular number of elements are depicted in FIG. 1, a practical environment may possess many more, perhaps hundreds or thousands, of each of the depicted elements. For example, in some embodiments, calculations performed by the modeling computer 103 may be distributed over multiple computers and/or processors. As another example, the table 104 stored by the database 100 may be distributed across multiple databases and/or storage devices. In addition, a practical environment may add or omit elements depicted in FIG. 1. For example, instead of accessing the database 100 over network 102, the modeling computer 103 may be directly connected to the database 100 without an intervening network 102, such as via an Ethernet cord or bus. As another example, the operating environment may include a separate administrative computer (not shown in FIG. 1) that receives user commands and issues instructions to the modeling computer 103.

In an embodiment, the database 100 represents organized data stored on one or more storage devices, such as the table 104. The exact format of the database is not critical to the techniques described herein. For example, the database 100 may store files in relational tables, Extensible Markup Language (XML) files, flat files, and so forth. In some embodiments the database 100 is managed by a database server 101 that is configured to store, retrieve, and modify data in the database 100. For example, the database 100 may be part of a Database Management System (DBMS) that includes the database 100 and the database server 101.

In an embodiment, database server 101 represents any combination of software and/or hardware components for managing the database 100. For example, the database 100 may represent a relational database and the database server 101 may execute software for processing database commands, such as DDL, which modify the structure of the database 100, and DML commands, which query and/or modify data in the database 100. As another example, the database server 101 may represent a file transfer protocol (FTP) server that stores data as flat files, which can be provided to the modeling computer 103 upon request. The exact implementation of the database server 101 is not critical to the techniques described herein.

In an embodiment, network 102 represents any combination of one or more local networks, wide area networks, internetworks, or service provider networks used by the computer 102 to retrieve data from the database 100. For example, network 102 may represent the public Internet, a local area network (LAN), a virtual private network (VPN), and so forth. However, in other embodiments, network 102 could be replaced a direct link between the modeling computer 103 and the database server 101 and/or the database 100. For example, the database 100 may represent a hard drive and the network 102 may be replaced with a bus between the database 100 and the modeling computer 103.

In an embodiment, the modeling computer 103 represents a computing device or software component configured to solve statistical models, such as logistic regression models, linear regression models, Poisson regression models, and so forth. In an embodiment, the modeling computer 103 represents a computing device as depicted in the block diagram of FIG. 4 and described below in Section 7.0 "Hardware Overview". However, in other embodiments, multiple modeling computers are utilized to perform calculations in parallel and speed up the solution of the statistical model. For example, matrix operations may be spliced, such that each modeling computer computes a portion of the matrix, which is then merged by one of the modeling computers to obtain the result. In some embodiments, the modeling computer 103 is a multi-processor or multi-core CPU system that can perform matrix operations in parallel by splicing the matrix between each of the available processors and combining the results. In some embodiments, an operation environment may use multiple modeling computers, each of which utilizes multiple processors to divide up the work.

In an embodiment, table 104 represents input data to an algorithm executed by the modeling computer 103 for solving a statistical model. For example, table 104 may represent a database table storing the input data, an XML document storing the input data, a flat file storing the input data, and so forth. The exact format of the table 104 is not critical to the techniques described herein.

In an embodiment, table 104 stores a number of observations (rows) and attributes (columns), representing the input data. The attributes are divided into predictors 105 and a dependent variable 106. In statistics, the predictors 105 are those variables believed to influence the dependent variable 106, and therefore can be used to predict the dependent variable 106. For example, assume that the problem being solved by the modeling computer 103 is to determine a function that, based on various factors, predicts a yearly income for a person. The predictors 105 may be factors such as age, sex, level of education, zip code, etc. and the dependent variable 106 would be yearly income. The modeling computer 103 takes as input a set of observations from the table 104, and determines the function between the predictors 105 and the dependent variable 106 based on one or more statistical models. As a result, when presented with a new set of predictors 105, the modeling computer 103 can use that function to predict the value of the dependent variable 106. In some cases, the table 104 may store more than one dependent variable 106, such as (building from the previous example), income and life expectancy.

In some embodiments, the table 104 is stored in association with metadata for the attributes that indicates the data type used to store that attribute. For example, for a column representing a continuous value, such as temperature, may be stored as a floating point value with the metadata indicating the floating point value data type for the column. As another example, for a column representing a categorical value, such as sex, the data may be stored as a character value, with metadata indicating character as the data type for the attribute. However, in other embodiments, the metadata for the table 104 also specifies broader categories than the exact data type stored by the attributes. For example, the metadata may specify whether the column stores values that are categorical or continuous. A value is categorical when there is a set of discrete states which the value is allowed to have. A value is continuous when the valid values fall within one or more ranges of allowed values. For example, continuous values may frequently be represented with floating point values, whereas categorical values may be associated more often with characters, strings, Booleans, or integers (e.g. for representing categories such as zip code).

Different types of statistical models assume different forms of dependent variables. For example, in logistic regression, the dependent variable is assumed to be binary (taking on one of two possible states). However, in multinomial logistic regression, the dependent variable can take on any number of discrete states. Still other models, such as linear regression, allows for the dependent variable to be a continuous value. Many of the examples in this disclosure are presented with respect to logistic regression and thus the dependent variable will be assumed to be binary (e.g. yes/no, male/female, etc.). However, in other embodiments, the type of the dependent variable will depend on the statistical model being utilized.

For cases where the dependent variable represents discrete values, the statistical models fall under the broader category of "classification models" or "classifiers". Thus, the value of the dependent variable is often referred to as the "class" or "classification" and the solution of the model results in a function that maps predictors to a particular class and/or a set of probabilities associated with the potential classes. For example, for a new observation with a particular set of predictors, many classifiers will use the function to determine the probability that the observation belongs to each of the potential classifications. The most probable classification is then chosen as the label for that new observation.

In some embodiments, the modeling computer 103 requests the table 104 (or data from the table 104) from the database server 101. In response, the database server 101 retrieves the requested data from the database 100 and sends the retrieved data back to the modeling computer 103. The modeling computer 103 then constructs an input matrix from the data of the table 104.

3.0 Identifying Sparse and Dense Matrix Data

Depending on the embodiment, the modeling computer 103 may store the input matrix in a variety of different formats. The matrix storage formats can be divided into two distinct categories, dense matrix format and sparse matrix format. Density, in relation to matrix formats, is a measure of the number of zeros in the matrix. Dense matrix format represents a category of matrix formats that can efficiently store matrices where few elements hold the value of zero. Sparse matrix format represents a category of matrix formats that can efficiently store matrices where a significant number of the elements hold the value of zero. The exact breaking point where one matrix format becomes more efficient than the other varies based on the exact implementation of the formats.

In an embodiment, dense matrix format is implemented by storing the data in memory as an array of values that can be directly indexed. For example, the matrix $$A = \begin{bmatrix} 1 & 2 & 3 \\ 4 & 5 & 6 \\ 7 & 8 & 9 \end{bmatrix}$$

can be represented in memory as an array of memory locations [1,2,3,4,5,6,7,8,9], with a reference to the element stored at index (i,j) being performed by retrieving the element stored at i+nj, where n is the number of columns in the matrix. While the example format provides for efficient retrieval $\{O(1)\}$, the space requirement is high $\{O(mn)\}$, where m is the number of rows and n is the number of columns. Furthermore, when performing matrix multiplication, each element is accessed, even when that element contains the value of zero and therefore would contribute nothing to the resultant matrix. When the number of zeros in the matrix is small, the benefit of the efficient retrieval tends to outweigh the cost of the additional accesses/operations performed for the zero value elements. However, when the number is zeros in the matrix is high, accessing/operating on the non-contributing elements begins to outweigh the benefits of the fast retrieval.

In one embodiment, sparse matrix format is implemented as a List of Lists (LIL). The LIL format stores one list per row, with each entry containing the column index and the value. Often, these values are stored in column order for faster lookup. For example, the matrix $$B = \begin{bmatrix} 1 & 0 & 0 \\ 0 & 5 & 6 \\ 0 & 8 & 0 \end{bmatrix}$$

could be stored as three link lists, L1=(1, 1), L2=(5,2), (6,3), L3=(8,2), where each link list contains a list of the elements in the corresponding row along with their associated columns. Thus, to reference an element, the modeling computer 103 for an element located at index i, j, starts at the list corresponding to i and walks down the list until the entry with column value j is found. In some embodiments where the values are stored in column order, the lookup can be expedited by using an efficient search algorithm. Compared to dense matrix format, retrieval is slower due to the lack of a direct index to each element. However, the space requirement can be significantly lower due to the storage scaling only with the number of non-zero elements. Furthermore, matrix operations, such as multiplication, can be performed more efficiently since only elements which contribute to the resultant matrix are considered.

While dense matrix format is efficient for dense matrices and sparse matrix format is efficient for sparse matrices, using the mismatching format type can be dangerously inefficient. For example, if a sparse matrix format is used to store a dense matrix, the storage benefit can be outweighed by the extra cost of storing the column value for each non-zero element. In addition, since most elements will contribute during matrix multiplication, the cost of a more expensive retrieval outweighs the benefit received from skipping access/operations on zero value elements. As another example, if dense matrix format is used for a sparse matrix, much of the storage space is wasted by storing zero value elements. In addition, many accesses during matrix multiplication will be unnecessary since those elements will not contribute to the resultant matrix.

The exact implementations of sparse/dense matrix format utilized by an embodiment are not critical. For example, other embodiments may store dense matrixes in column-major format, rather than row-major format as given in the above example. Furthermore, other embodiments may use a different sparse matrix format, such as dictionary of keys, coordinate lists, Yale, compressed sparse row, compressed sparse column, and so forth, some of which have superior retrieval compared to LIL, but at the cost of less efficient building and/or modification of the matrix.

For the following discussion, when an operation such as matrix multiplication, factorization, forward substitution, and so forth is described as "sparse" or "dense", the operation is performed based on matrices which are stored in a format of the specified density.

4.0 Nomenclature and Problem Summary

The techniques described herein are applicable to a wide array of statistical models, particularly generalized linear models whose solution involves the calculation of a Hessian matrix (matrix of second derivatives). In order to illustrate clear examples, the techniques described herein will be explained in the context of solving a logistic regression probability model.

Logistic regression probability model is as follows, $$P(y = \pm 1, x_i, w) = \frac{1}{1 + \exp(-yw^T x_i)}$$

Where $y \in \{+1,-1\}$ is the class indicator, $x_i$ is the i-th row of the input matrix X, the bias term is included in $x_i$, and w is the vector of weights. The underlying optimization problem is to minimize the negative log-likelihood function:

$$l(w) = \sum_{i=1}^{m} \log(1 + \exp(-y_i w^T x_i))$$

For Newton algorithm and its variants, the solution to the optimization utilizes the gradient (first derivative) and the Hessian (second derivative) of l(w). Calculating a gradient is not a complicated or expensive procedure. However, the Hessian computation can be quite expensive:

$$H = X^T A X$$

where A is a diagonal matrix $$A_{ii} = \sigma(y_i w^T x_i)(1 - \sigma(y_i w^T x_i))$$

and $\sigma(p) = 1/(1+\exp(-p))$ is the logistic sigmoid function.

In an embodiment that uses parallel (or parallel distributed) computations, X and A are partitioned into M row blocks (horizontal partitions):

$$X^T = [X_1^T X_2^T \ldots X_M^T]$$

$$A^T = [A_1^T A_2^T \ldots A_M^T]$$

where $X_i \in \mathbb{R}^{m_i \times n}$, $A_i \in \mathbb{R}^{m_i \times m_i}$ are contiguous partition blocks. The corresponding Hessian matrix is then given as follows $$H = \sum_{i=1}^{M} X_i^T A_i X_i$$

The individual computations $X_i^T A_i X_i$ can be carried out independently from each other with the corresponding results efficiently accumulated, such as via tree-based reduction. Thus, for example, assuming the modeling computer 103 is a multi-processor system, the computation of the partitions may be divided among the available processors. Similarly, for operating environments that utilize multiple computers, the computations for each partition can be divided among the available computers.

Solving the above described problem depends upon many factors, such as the parallel platform, whether calculations are performed in memory verses out-of-core, and the efficient computation of the Hessian. The techniques described herein illustrate how to efficiently compute the Hessian by determining whether the input matrix contains more than a threshold number of dense columns. If so, the modeling computer 103 computes a sparsified version of the input matrix, via a process referred to as fuzzy selection of maximum values. The modeling computer 103 then computes the Hessian using sparse matrix operations. Otherwise, the modeling computer 103 identifies which rows are dense and which rows are sparse. The modeling computer 103 then groups the columns by their density and partitions the matrix, using sparse matrix format to store the sparse columns and dense matrix format to store the dense columns. The modeling computer 103 then computes the component parts of the Hessian matrix using matrix multiplication techniques suited to the different components and recombines the results to obtain the Hessian matrix and Cholesky factors for the input matrix.

5.0 Efficient Cross Product Algorithm for Logistic Regression

FIG. 2 is a block diagram illustrating a process to efficiently compute a Hessian (cross product) according to an embodiment. The following assumes that the process depicted in FIG. 2 is performed by modeling computer 103.

To simplify the notation, the letter X that had previously been used to denote the input matrix will also be used in this section to denote the row-scaled matrix.

$$X_i \leftarrow (A_i)^{\frac{1}{2}} X_i$$

At block 200, the modeling computer 103 receives the input matrix $X \in \mathbb{R}^{m \times m}$. In some embodiments, the modeling computer 103 receives the input matrix X from the database server 101 in response to submitting a query for the table 104. However, in other embodiments, the database server 101 pushes the table 104 to the modeling computer 103 in response to a command issued at the database server 101 or from a separate administrative computer (not depicted in FIG. 1). In some embodiments, the modeling computer 103 also receives additional information, metadata associated with the table 104 and/or a maximum number of dense columns that will be allowed before triggering matrix sparsification.

At block 201 the modeling computer 103 partitions the columns of the input matrix X into two disjoint groups:

sparse columns and dense columns. In some embodiments, the columns are partitioned based on metadata associated with the table 104, such as the data type associated with each column. For example, the modeling computer 103 may consider columns associated with the character data type as sparse columns and columns associated with the double floating point data type as dense columns. As another example, the modeling computer 103 may store a flag with each column indicating whether the column is categorical or continuous, with the categorical columns put into the sparse column category and continuous columns put into the dense column category. In another embodiment, the modeling computer 103 counts the number of zeros in each column (or a sample of each column) and if the number is greater than a particular threshold the column is considered sparse, otherwise the column is considered dense. In some embodiments, the modeling computer 103 uses combinations of the factors described above to determine column density. For example, character columns could be considered sparse, with columns storing numerical values being considered dense unless a majority of the coefficients are zeros.

At block 202 the modeling computer 103 re-orders the input columns to ensure row chunks are given as follows:

$$X_i = [S_i D_i]$$

where $S_i$ are sparse columns and $D_i$ are the dense columns. In some embodiments, the sparse columns are stored in a sparse columns format and the dense columns are stored in a dense column format. For example, the sparse columns may be stored as a LIL or compressed row storage and the dense columns may be stored in one or more double floating point arrays.

In some embodiments, the modeling computer 103 also computes a column map that establishes a relationship between the original column positions (e.g. original column number) and the new positions within the aforementioned group. In cases where the operating environment utilizes multiple computers and/or the modeling computer 103 includes multiple processors which perform parallel processing on the input matrix, the column map is broadcasted to the participating computers/processors. The column map may be used, for example, to perform operations such as matrix multiplication, where the original positions are used to determine which elements to multiply.

At block 203, the modeling computer 103 determines whether the number of dense columns exceeds a threshold. If the number of dense columns exceeds the threshold, the modeling computer 103 sparsifies the matrix at block 207. For example, the modeling computer 103 may perform the process depicted in FIG. 3 and discussed below Section 6.0 "Fuzzy Selection of Maximum Values in a Matrix". After sparsification is performed at block 207, the input matrix has been converted into a sparse matrix, which is stored in a sparse matrix format. As a result, at block 208 the Hessian matrix and Cholesky factors are computed using sparse matrix techniques. If the number of dense columns is at or below the threshold, the modeling computer 103 proceeds to block 204.

In some embodiments, the modeling computer 103 stores the threshold as a predefined maximum number of dense columns allowed before sparsification procedures are invoked. However, in other embodiments, the threshold may be received as input along with the input matrix at block 200. For example, a user may utilize a command line interface (CLI) to invoke the modeling computer 103 to retrieve the input matrix and solve the statistical model, with the threshold being entered as an argument.

At block 204, the modeling computer 203 computes an intermediate cross product $H_i$ as follows:

$$X_i^T X_i = \begin{bmatrix} S_i^T S_i & S_i^T D_i \\ D_i^T S_i & D_i^T D_i \end{bmatrix}$$

In an embodiment, $S_i^T S_i$ is a sparse transpose-sparse matrix product, and can be computed using sparse matrix multiplication, such as an implementation utilizing the Gilbert theorem. The dense block $D_i^T D_i$ is computed by direct multiplication, thus avoiding indirect reference for each sparse matrix element. $S_i^T D_i$ is efficiently computed by accessing only nonzero coefficients of the sparse matrix $S_i$, and via direct access to the dense matrix elements D.

At block 205 the modeling computer 103 performs reduction to compute H. In an embodiment, $H \leftarrow H_i + H_j$ is computed as follows:

$$S^T S \leftarrow S_i^T S_i + S_j^T S_j \qquad \text{Sparse matrix addition}$$

$$S^T D \leftarrow S_i^T D_i + S_j^T D_j \qquad \text{Dense matrix addition}$$

$$D^T D \leftarrow D_i^T D_i + D_j^T D_j \qquad \text{Dense matrix addition}$$

As mentioned previously, sparse matrix operations (such as addition) can be extremely inefficient for dense inputs, where dense matrix addition (such as a BLAS-1 daxpy function) would much faster. Therefore, by partitioning the inputs into sparse-dense groups, significant speedup can be achieved compared to keeping the entire matrix in one homogenous format.

At block 206, the modeling computer 103 performs Cholesky factorization. In an embodiment, Cholesky factorization is performed by $$\begin{bmatrix} S^T S & S^T D \\ D^T S & D^T D \end{bmatrix} = \begin{bmatrix} U^T & 0 \\ F^T & G^T \end{bmatrix} \begin{bmatrix} U & F \\ 0 & G \end{bmatrix}$$

where U is a sparse upper-triangular matrix, G is a dense upper-triangular, and F is a general dense matrix. The Cholesky decomposition can be performed in three steps. First, $S^T S = U^T U$ is computed via sparse multifrontal Cholesky factorization, then $F = U^{-T} S^T D$ is computed via sparse forward substitution for multiple right-hand-sides. Finally, $G^T G = D^T D - F^T F$ is computed via dense Cholesky factorization.

6.0 Fuzzy Selection of Maximum Values in a Matrix

Figure 3B:
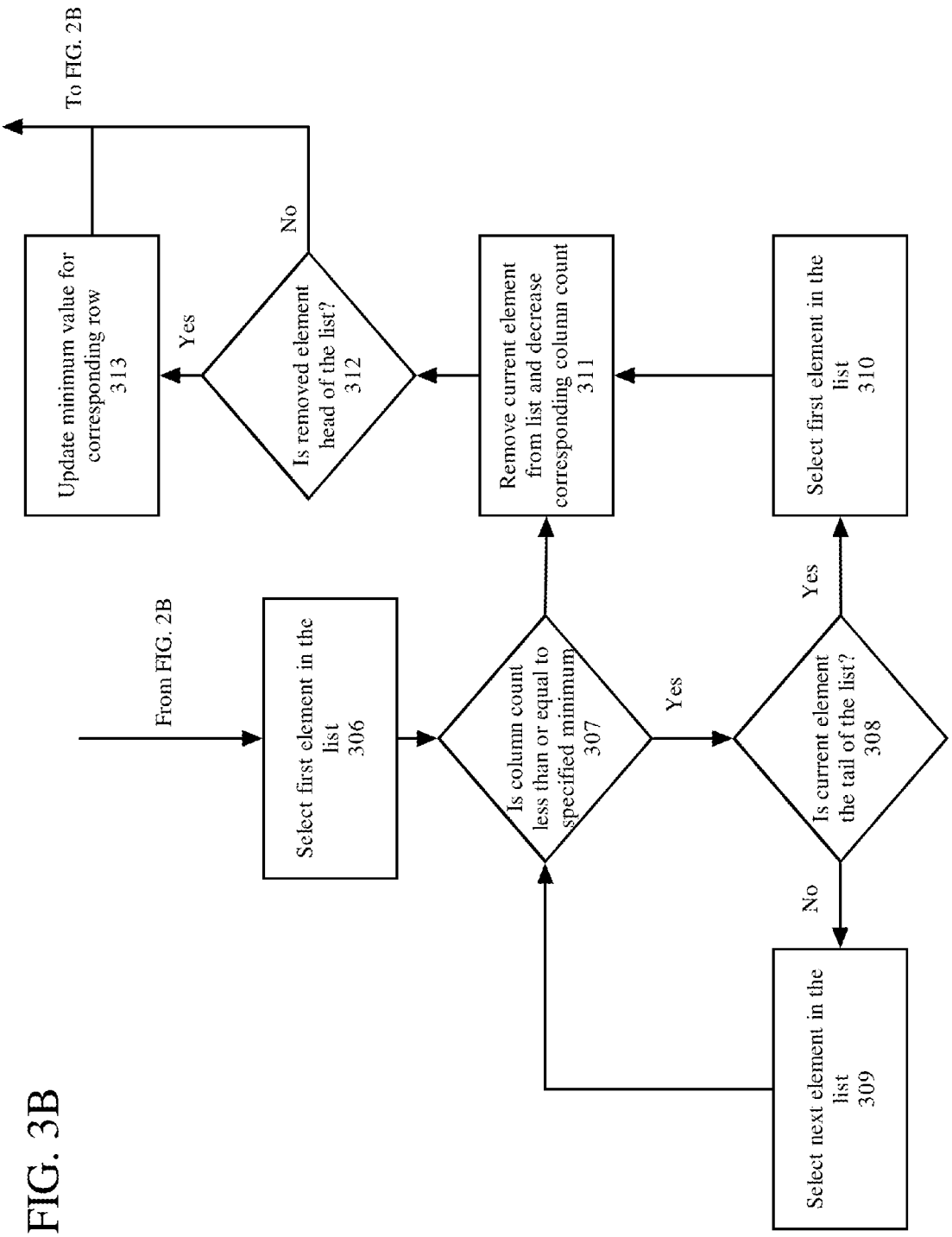
FIG. 3B is a block diagram illustrating a second view of a process for sparsifying a matrix according to an embodiment.

In an embodiment, FIGS. 3A and 3B represent a process that sparsifies a dense input matrix to produce a sparse matrix that preserves most of the valuable information. This is achieved by keeping only a set of maximum absolute value elements (the ones which affect matrix operations the most) and discarding/nullifying elements with minimal values (that affect matrix operations the least).

In an embodiment, the sparsification process carries the following characteristics:

Compresses a dense matrix to a predefined size sparse matrix.

Keeps predefined number of elements in each row and each column.

Runtime can be controlled by result quality or algorithm complexity.

In an embodiment, input is a matrix $X \in \mathbb{R}^{m \times n}$, with n columns and m rows. The size of the matrix is not limited, but performance can be optimized by ensuring that at least one complete row (or column) can be fit into working memory along with the algorithm operational structures that will be described below (structures (a), (b), and (c)). In some embodiments, the whole matrix cannot be fit into memory, as a result the matrix is split into partitions and the same sparsification process can be applied to the matrix's sequential/parallel splits. In some embodiments, the matrix is split into partitions not due to memory limitations, but to increase performance by allowing partitions to be processed in parallel.

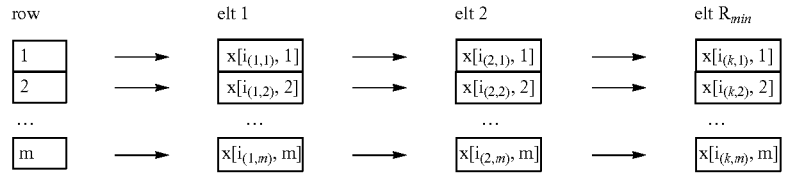

In some embodiments, in addition to the input matrix, the modeling computer 103 receives:

$R_{min}$—minimum number of elements to be selected per each row $C_{min}$—minimum number of elements to be selected per each column.

However, in other embodiments, $R_{min}$ and $C_{min}$ are pre-defined default values, rather than received inputs.

In an embodiment, the output of the sparsification process is a sparse matrix in a sparse matrix format (e.g. CRS, CCS, COO, DOK, LIL, Yale, etc.). In some embodiments, the sparse matrix is stored in an "external" file and the regression process ingests the sparsified data from this external storage source for further processing. However, in other embodiments, the sparsified matrix is stored completely in working memory and does not touch an external storage at all while passing the data to the regression computation algorithm. The exact format of the output matrix is not critical. In some embodiments, the process takes an additional input variable that specifies the sparse matrix format to use when storing the sparsified matrix. In an embodiment, in the event that the input matrix is split by rows (or columns) to fit in memory (or for computation parallelization), the final result are a merge of the sparse matrix by row (or by column).

In an embodiment, the sparsification process attempts to avoid scanning and sorting of large dense input matrices by selecting (pseudo-)random elements and uses a linked list for maintaining elements with maximum values seen in the randomized selection. For most cases, linked lists provide efficient performance due to linear insertion and deletion complexity. Furthermore, the sparsification process utilizes sequential access, rather than random access, thus the drawbacks to the indirect referencing of a linked list are fairly minor. Although a linked list will be used to illustrate examples, other structures (such as arrays) may also be used in other embodiments.

In an embodiment, in order to qualify for the "maximum" value selection criteria, the sparsification process dynamically builds and updates data distribution statistics for each row. For example, maintaining minimum, maximum, and "minmax" (maximum value out of all discarded) seen values in the randomized selection. The data distribution statistics allow the modeling computer 103 to predict an expected percentile of the selected maximum values per row.

In an embodiment, in order to comply with selecting some minimal number of elements for each column $C_{min}$, the modeling computer 103 keeps track of selecting elements per each column as well. As a result, the modeling computer 103 is able to make better selections of a minimal element to discard when inserting a new value in a row selection list, which already is full (contains $R_{min}$ elements).

In an embodiment, the modeling computer 103 maintains three operational structures for use with the sparsification process:

Fuzzy Selection List (a):

where: → represents a pointer and $x[i_{(b,a)}, a]$ represents a randomly selected element at row a, column $i_{(b,a)}$.

Row Value Distribution (b):

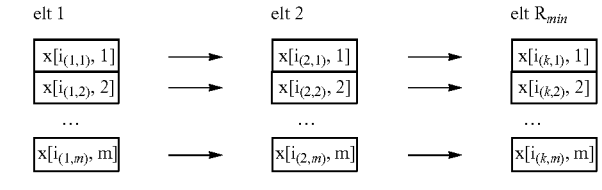

where: $x[j_a^{min}, a]$ is a randomly selected element at row a, column $j_a^{min}$ (same for minmax and max) and for seen, $rr_a$ is the number of elements observed at row a.

Column Counts (c):

| column | count | seen |
|---|---|---|
| 1 | $xc_1$ | $cc_1$ |
| 2 | $xc_2$ | $cc_2$ |
| ... | ... | ... |
| n | $xc_n$ | $cc_n$ |

Where $xc_a$ is the number of elements selected at column a and $cc_a$ is the number of elements observed at column a.

FIG. 3A and FIG. 3B illustrate a process for sparsifying a matrix in block diagram form according to an embodiment. The following explanation assumes the process depicted in FIG. 3A and FIG. 3B are performed by modeling computer 103.

At block 300, the modeling computer 103 receives the input matrix. In some embodiments, the modeling computer 103 receives the input matrix from the database server 101 in response to submitting a query for the table 104. However, in some embodiments, the modeling computer 103 receives the input matrix at block 200 of FIG. 2 and the sparsification process depicted in FIG. 3 represents block 207 of FIG. 2. For example, the modeling computer 103 may receive the table 104 at block 200 of FIG. 2, store the table 104 as an input matrix in dense matrix format, then determine at block 203 that the number of dense columns exceeds the threshold. For the following examples, it is assumed the input matrix is stored in dense matrix format and in sequential memory segments. However, although considering the matrix as stored in sequential memory segments is helpful to illustrate clear examples, other embodiments may use non-continuous memory segments to store the input matrix.

At block 301, the modeling computer 103 generates a random index and retrieves the element at that index. For example, assuming the matrix is stored in an array [0, n*m] the modeling computer 103 generates a random number r in the [0, n*m] range and retrieves an element x at this position.

At block 302, modeling computer 103 determines whether the selected element is already in the selection list for the selected element's row. If the selected element x is not present in the selection list (a), the modeling computer 103 inserts x into the list corresponding to row R=floor (r/n) in ascending order at block 303. With the element value, the modeling computer 103 stores the column index C=mod(r/m). Then, at block 304, the modeling computer updates the row distribution (b) minimum, maximum, and "seen" values for the selected element's row R and increments the column counts (c) for the selected element's column C. If the element is already in the selection list for the row, the modeling computer proceeds back to block 301.

At block 305, the modeling computer 103 determines whether the selection list for the row is longer than a specified threshold. In an embodiment, the modeling computer 103 uses the value $R_{min}$ as the specified threshold. If the selection list for the row is longer than the specified threshold, the modeling computer 103 proceeds to block 306. Otherwise, the modeling computer 103 returns to block 301.

At block 306, the modeling computer 103 selects the first element in the list corresponding to the selected element's row.

At block 307, the modeling computer 103 determines whether the column count (c) corresponding to the column of the selected element is less than or equal to the specified minimum of selected elements $C_{min}$. If the column count (c) is less than or equal to $C_{min}$, proceeds to block 308. Otherwise, the modeling computer 103 determines whether the currently selected element is the tail of the list at block 308. If so, At block 308, the modeling computer 103 determines whether the currently selected element is the tail of the list. If so, the modeling computer 103 selects the first element in the list at block 310 and then proceeds to block 311. Otherwise, the modeling computer 103 moves to the next element of the list and returns to block 307.

At block 311 the modeling computer 103 removes the current element from the list and decreases the corresponding column count.

At block 312, the modeling computer 103 determines whether the removed element was the head of the list. If so, the modeling computer 103 updates the row distribution (b) "minmax" value by selecting the minimum value at block 313 and then proceeds to block 314. In some embodiments, "minmax" is updated using the value of the element removed at block 312. Otherwise, the modeling computer 103 proceeds directly to block 314.

At block 314, the modeling computer 103 determines whether the number of selected elements for any row is less than the specified minimum of selected elements $R_{min}$. If so, the modeling computer 103 returns to block 301. Otherwise, the modeling computer 103 proceeds to block 315.

At block 315, the modeling computer 103 determines whether the stopping criteria have been met. In an embodiment, the stopping condition is run-time based and the modeling computer 103 compares the "seen" values for each row in the row distribution (b) and for each column in the column counts (c) to a specified value of how many elements per row and per column to select before finishing, such as $R_{min}$ and $C_{min}$. In some embodiments, the modeling computer 103 supports multiple run-time based stopping conditions. For example, the modeling computer 103 can retrieve a pre-defined number of elements (or a percentage of the input matrix) before exiting. Thus, N elements in total of the whole matrix (constant iteration number) are retrieved into the sparsified matrix. This provides a hard run-time guarantee in that N iterations will be performed. As another example, the modeling computer 103 can retrieve at least N elements per each row before stopping iterations. This strategy provides better quality of the resulting sparsified matrix, but has a relaxed runtime guarantee as its runtime will be measured by normally distributed probability. In another embodiment, the stopping condition is quality based and the modeling computer 103 performs a determination based on the approximate distributions of selected values in each row. Thus, the Nth percentile of values with pre-defined probability based on the distribution approximation are retrieved into the sparsified matrix. For example, the modeling computer 103 may determine that the distribution of each row is within a threshold tolerance of the distribution of that row in the original input matrix. As another example, the modeling computer 103 may compare the row distribution (b) statistics to statistics for each row to distribution statistics in the original row of the input matrix.

At block 316, the modeling computer 103 outputs the fuzzy selection list (a) as the sparsified matrix. However, in other embodiments, the modeling computer 103 may convert the fuzzy selection list (a) to another sparse matrix format or alternatively build the fuzzy selection list (a) to adhere to the sparse matrix format of choice. In some embodiments, rather than storing the sparsified matrix in an "external" storage area, such as a file of a file system, the sparsified matrix is kept in working memory for the modeling computer 103 to utilize with the regression algorithm.

7.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
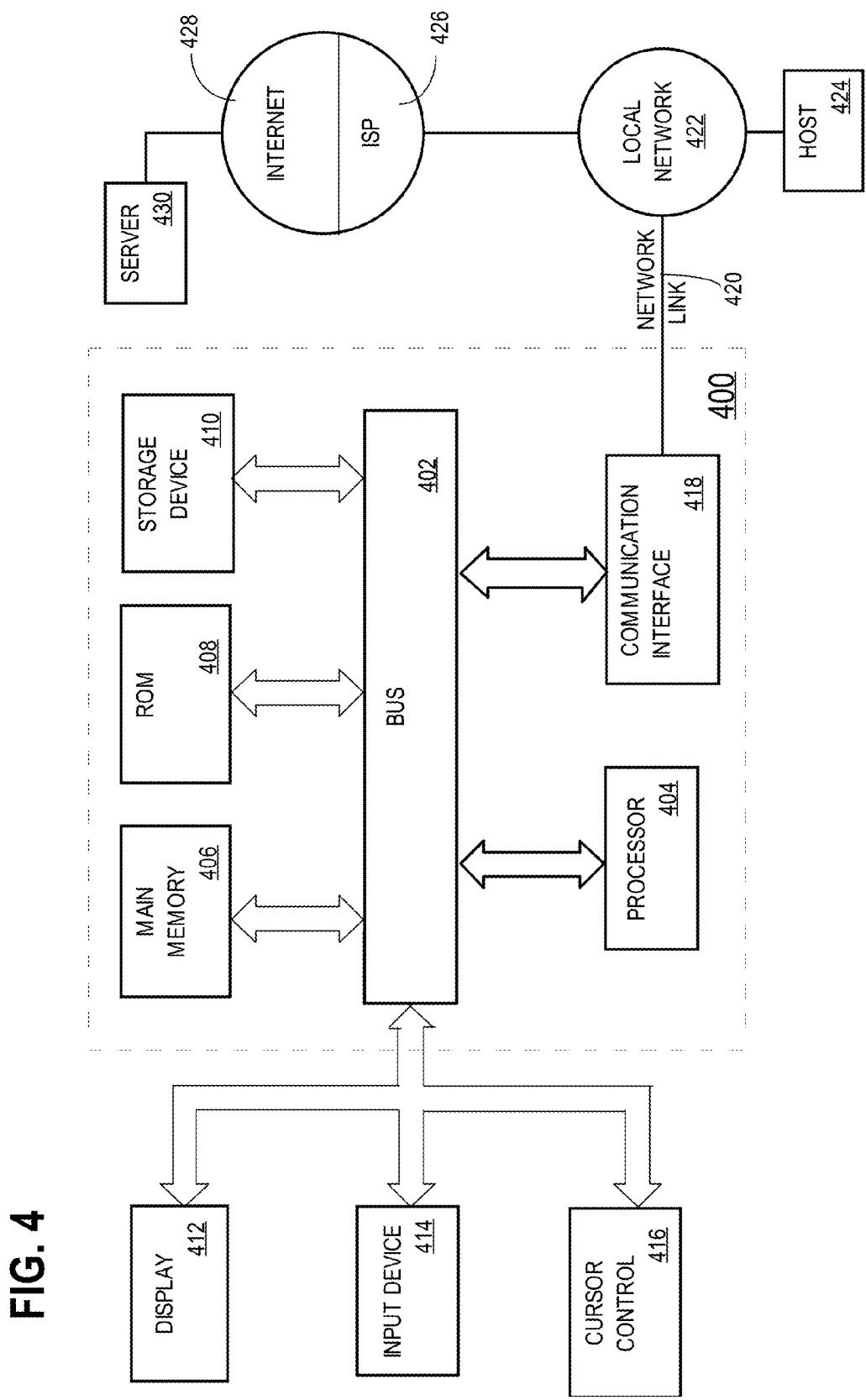
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose or multi-core microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
receiving an input matrix containing a plurality of elements, wherein the elements are organized into one or more rows and one or more columns;
partitioning the one or more columns of the input matrix into one or more sparse columns and one or more dense columns;
determining whether a count of the one or more dense columns exceeds a specified threshold of dense columns;
in response to determining that the count exceeds the specified threshold of dense columns, sparsifying the input matrix by at least:
randomly selecting an element from the input matrix and, if the element is not already placed in a sparse matrix, placing the element in a corresponding position of the sparse matrix, and
in response to a determination that a row of the sparse matrix to which the element belongs exceeds a threshold number of row elements, removing from the row a lowest value element that has a corresponding column of the sparse matrix that exceeds a threshold number of column elements or, if the row does not contain any element that has a corresponding column that exceeds the threshold number of column elements, the lowest value element of the row;
repeating said sparsifying the input matrix until each row of the sparse matrix contains the threshold number of the row elements; and
repeating said sparsifying the input matrix until a stopping condition has been met; and
wherein the method is performed by one or more computing devices.

2. The method of claim 1, further comprising tracking one or more row distribution statistics for each row of the sparse matrix and wherein the stopping condition is met when the one or more row distribution statistics for each row of the sparse matrix are within a threshold tolerance of a distribution of a corresponding row of the input matrix.

3. The method of claim 1, further comprising tracking, for each row of the sparse matrix, a count of different elements that have been randomly selected from the input matrix for insertion into a corresponding row of the sparse matrix and, for each column of the sparse matrix, a count of elements that belong to the column, wherein the stopping condition is met when, for each row, the count of the different elements that have been randomly selected equal or exceed a minimum number of seen elements and, for each column, the count of the elements that belong to the column equal or exceed a minimum number of column elements.

4. The method of claim 1, wherein the sparse matrix comprises a list for each row of the sparse matrix and, for each row, each particular element of the sparse matrix is stored in the list in ascending order along with a value representing a column that corresponds to the particular element.

5. A non-transitory computer-readable storage medium storing one or more instructions which, when executed by one or more processors, cause the one or more processors to perform:
receiving an input matrix containing a plurality of elements, wherein the elements are organized into one or more rows and one or more columns;
partitioning the one or more columns of the input matrix into one or more sparse columns and one or more dense columns;
determining whether a count of the one or more dense columns exceeds a specified threshold of dense columns;
in response to determining that the count exceeds the specified threshold of dense columns, sparsifying the input matrix by at least:
randomly selecting an element from the input matrix and, if the element is not already placed in a sparse matrix, placing the element in a corresponding position of the sparse matrix, and
in response to a determination that a row of the sparse matrix to which the element belongs exceeds a threshold number of row elements, removing from the row a lowest value element that has a corresponding column of the sparse matrix that exceeds a threshold number of column elements or, if the row does not contain any element that has a corresponding column that exceeds the threshold number of column elements, the lowest value element of the row;
repeating said sparsifying the input matrix until each row of the sparse matrix contains the threshold number of the row elements; and
repeating said sparsifying the input matrix until a stopping condition has been met.

6. The non-transitory computer-readable storage medium of claim 5, wherein the one or more instructions, when executed by said one or more processors, further cause tracking one or more row distribution statistics for each row of the sparse matrix and wherein the stopping condition is met when the one or more row distribution statistics for each row of the sparse matrix are within a threshold tolerance of a distribution of a corresponding row of the input matrix.

7. The non-transitory computer-readable storage medium of claim 5, wherein the one or more instructions, when executed by said one or more processors, further cause tracking, for each row of the sparse matrix, a count of different elements that have been randomly selected from the input matrix for insertion into a corresponding row of the sparse matrix and, for each column of the sparse matrix, a count of elements that belong to the column, wherein the stopping condition is met when, for each row, the count of the different elements that have been randomly selected equal or exceed a minimum number of seen elements and, for each column, the count of the elements that belong to the column equal or exceed a minimum number of column elements.

8. The non-transitory computer-readable storage medium of claim 5, wherein the sparse matrix comprises a list for each row of the sparse matrix and, for each row, each particular element of the sparse matrix is stored in the list in ascending order along with a value representing a column that corresponds to the particular element.

\* \* \* \* \*